US008902612B2

(12) United States Patent
Inuduka et al.

(10) Patent No.: US 8,902,612 B2
(45) Date of Patent: Dec. 2, 2014

(54) POWER CONVERSION APPARATUS

(75) Inventors: Aiko Inuduka, Fukuoka (JP); Toshio Nagao, Fukuoka (JP); Hidenori Hara, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 87 days.

(21) Appl. No.: 13/044,572

(22) Filed: Mar. 10, 2011

(65) Prior Publication Data
US 2011/0228508 A1 Sep. 22, 2011

(30) Foreign Application Priority Data

Mar. 17, 2010 (JP) ................................. 2010-061149
Jan. 7, 2011 (JP) ................................. 2011-002402

(51) Int. Cl.
*H05K 7/02* (2006.01)
*H02M 7/00* (2006.01)
*H01G 4/38* (2006.01)

(52) U.S. Cl.
CPC ..................................... *H02M 7/003* (2013.01)
USPC ........... 361/811; 363/141; 361/328; 361/704; 361/830

(58) Field of Classification Search
USPC .......... 174/258–261, 350–354; 361/811, 818; 29/832–844, 854–857
See application file for complete search history.

(56) References Cited

U.S. PATENT DOCUMENTS 5,694,301 A * 12/1997 Donegan et al. ............. 361/830
6,822,850 B2 * 11/2004 Pfeifer et al. ................ 361/611
6,867,970 B2 * 3/2005 Muller et al. ................ 361/695
7,477,505 B2 * 1/2009 Timmerman et al. ........ 361/502
7,881,086 B2 * 2/2011 Nakayama et al. ........... 363/144
7,961,472 B2 * 6/2011 Tokuyama et al. ........... 361/718
2006/0232942 A1 * 10/2006 Nakatsu et al. .............. 361/710
2009/0213564 A1 * 8/2009 Kakuda et al. .............. 361/811

FOREIGN PATENT DOCUMENTS

| JP | 09-135582 | 5/1997 |
|---|---|---|
| JP | 11-98852 | 4/1999 |
| JP | 2000-152662 | 5/2000 |
| JP | 2001-352766 | 12/2001 |
| JP | 2003-319665 | 11/2003 |
| JP | 2005-012940 | 1/2005 |
| JP | 2007-221892 | 8/2007 |
| JP | 2008-295238 | 12/2008 |

OTHER PUBLICATIONS

Japanese Office Action for corresponding JP Application No. 2011-002402, Mar. 11, 2014.
Japanese Office Action for corresponding JP Application No. 2011-002402, Sep. 3, 2013.
Korean Office Action for corresponding KR Application No. 10-2011-0017707, Jun. 25, 2014.

(Continued)

*Primary Examiner* — Zachary M Pape
*Assistant Examiner* — Douglas Burtner
(74) *Attorney, Agent, or Firm* — Mori & Ward, LLP

(57) ABSTRACT

A power conversion apparatus includes a switching circuit including semiconductor switches, and a main circuit capacitor connected between a DC power source and the switching circuit. The main circuit capacitor includes a capacitor element, first wiring members that connect the DC power source to the switching circuit, and second wiring members that connect the capacitor element to the switching circuit. The capacitor element, the first wiring members, and the second wiring members are received in a case.

5 Claims, 13 Drawing Sheets

(56) References Cited

OTHER PUBLICATIONS

Chinese Office Action for corresponding CN Application No. 201110048793.0, Sep. 4, 2014.

Japanese Office Action for corresponding JP Application No. 2011-002402, Oct. 7, 2014.

* cited by examiner

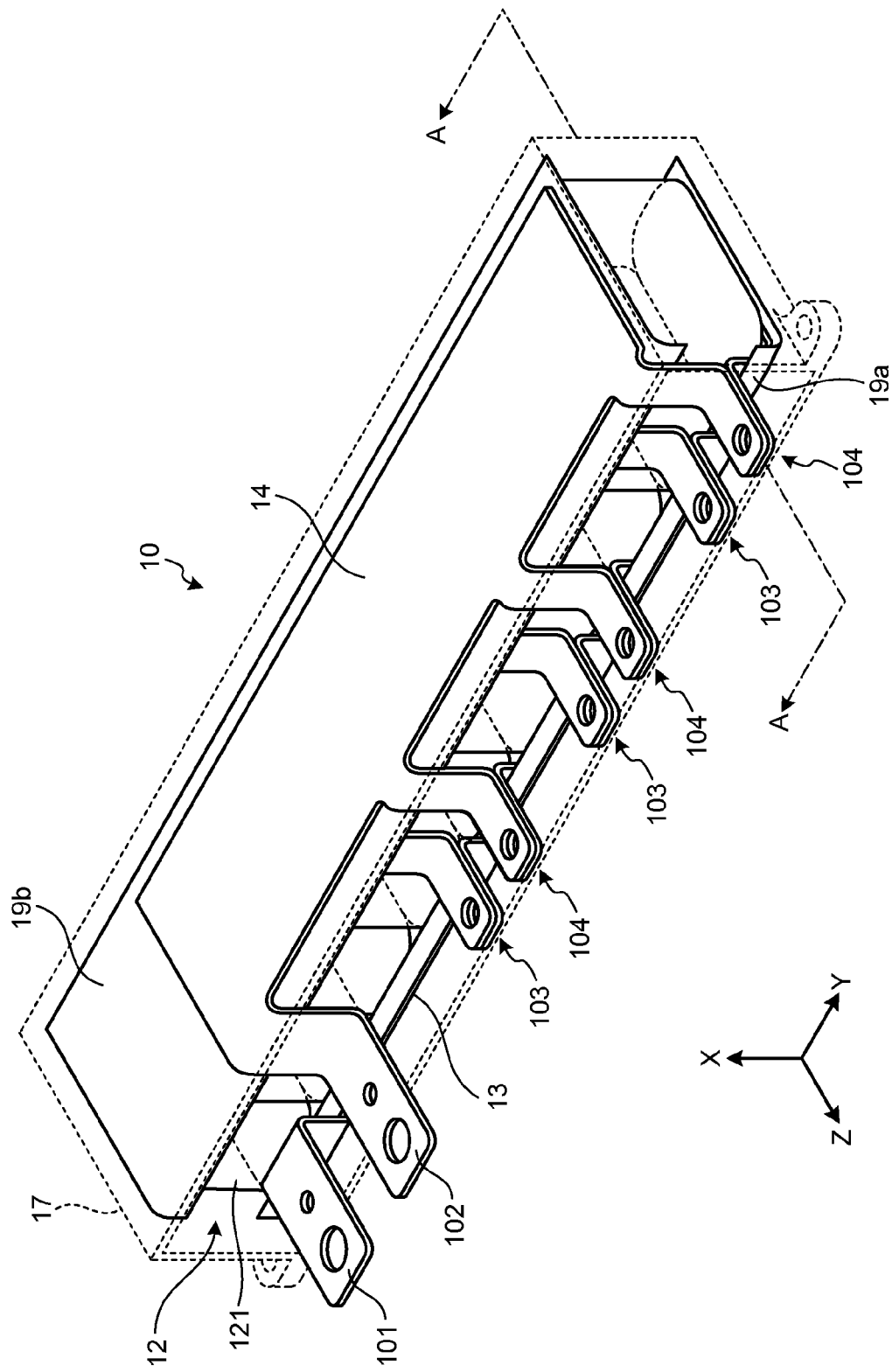

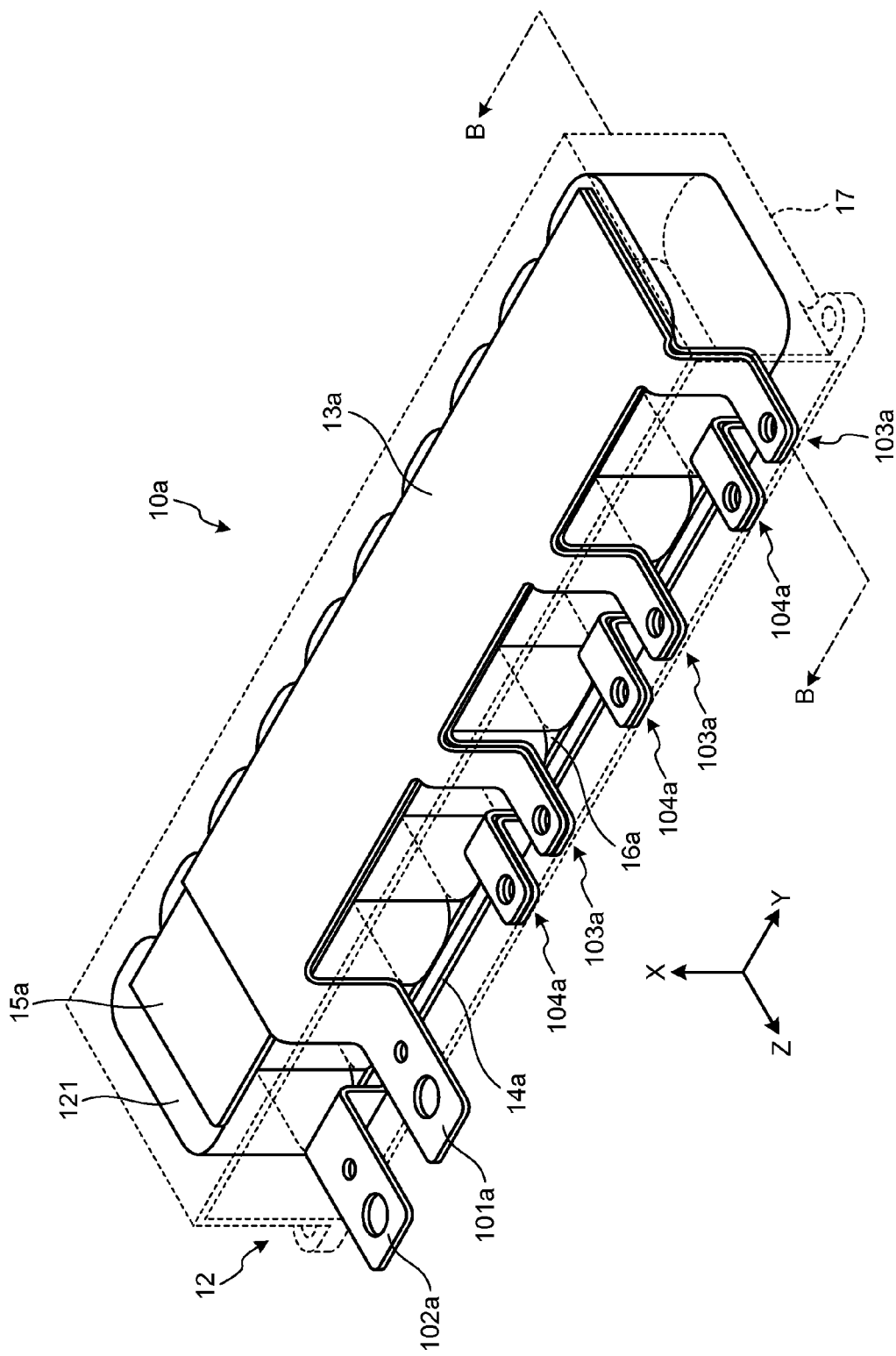

POWER CONVERSION APPARATUS

CROSS-REFERENCE TO RELATED APPLICATIONS

This application is based upon and claims the benefit of priority of the prior Japanese Patent Application No. 2010-061149, filed on Mar. 17, 2010; and Japanese Patent Application No. 2011-002402, filed on Jan. 7, 2011, the entire contents of all of which are incorporated herein by reference.

FIELD

The disclosed embodiments relate to a power conversion apparatus that performs power conversion using a switching circuit.

BACKGROUND

Conventionally, there has been disclosed a power conversion apparatus that performs power conversion using a switching circuit including a semiconductor switch such as an IGBT. For example, as the power conversion apparatus, there has been disclosed a voltage-type inverter that converts a DC voltage into an AC voltage using a switching circuit and outputs the AC voltage.

In the power conversion apparatus, a smoothing capacitor is provided between a DC power source and the switching circuit to smooth a voltage (for example, refer to Japanese Patent Laid-Open Publication No. 2007-221892). The smoothing capacitor is called a main circuit capacitor and is connected to the switching circuit through a bus bar.

However, for example, a high frequency ripple current and the like flow through the bus bar that connects the main circuit capacitor to the switching circuit, causing heat by a skin effect. Furthermore, as the length of the bus bar increases, impedance in a high frequency region should be considered and eventually becomes a main factor that generates a surge voltage at the time of switching of the switching circuit.

In this regard, it is preferable to shorten the length of the bus bar that connects the main circuit capacitor to the switching circuit.

SUMMARY

A power conversion apparatus according to an aspect of embodiments comprises a switching circuit including semiconductor switches, and a main circuit capacitor connected between a DC power source and the switching circuit. The main circuit capacitor includes a capacitor element, first wiring members that connect the DC power source to the switching circuit, and second wiring members that connect the capacitor element to the switching circuit. The capacitor element, the first wiring members, and the second wiring members are received in a case.

BRIEF DESCRIPTION OF THE DRAWINGS

FIG. 4B is a see-through view explaining an inside of a case of a main circuit capacitor according to a first embodiment.

FIG. 5B is a see-through view explaining an inside of a case of a main circuit capacitor according to a second embodiment.

DESCRIPTION OF EMBODIMENTS

Hereinafter, a power conversion apparatus according to embodiments of the present disclosure will be described in detail. In addition, the embodiments disclosed below are not intended to limit the present invention.

First Embodiment

Figure 1:
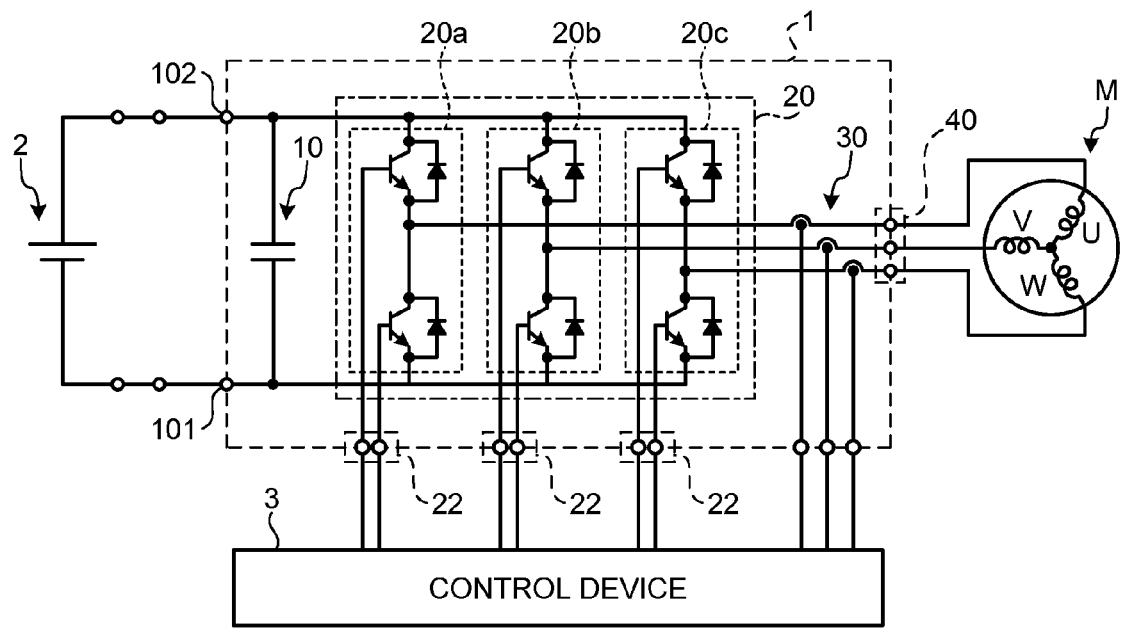
FIG. 1 is a diagram illustrating the circuit configuration of a power conversion apparatus according to a first embodiment.

First, the circuit configuration of a power conversion apparatus according to a first embodiment will be described with reference to FIG. 1. FIG. 1 is a diagram illustrating the circuit configuration of the power conversion apparatus according to the first embodiment.

A power conversion apparatus 1 illustrated in FIG. 1 includes an inverter unit 20 that converts a DC voltage, which is input from a DC power source 2 to first connection portions 101 and 102 serving as input terminals, into a three-phase AC voltage and outputs the three-phase AC voltage to a three-phase motor M from output terminals provided to an output terminal block 40. In addition, the first connection portion 101 is connected to a negative side of the DC power source 2 and the first connection portion 102 is connected to a positive side of the DC power source 2.

The inverter unit 20 is a switching circuit provided with switching element sections 20a to 20c including a pair of serially connected semiconductor switches, respectively. Each of the switching element sections 20a to 20c is controlled based on a driving signal which is input from a control device 3 to connectors 22. In addition, as the semiconductor switch constituting each of the switching element sections 20a to 20c, for example, a power semiconductor element such as an IGBT or a MOSFET is used. Furthermore, a reflux diode is connected to each semiconductor switch.

Furthermore, a current detector 30 is provided between the inverter unit 20 and the output terminal block 40 to detect a value of a current flowing from each of the switching element sections 20a to 20c to the three-phase motor M. The control device 3 inputs a driving signal according to a detection result and the like obtained by the current detector 30 to the connectors 22.

In addition, the power conversion apparatus 1 includes a main circuit capacitor 10 provided between the DC power source 2 and the inverter unit 20 to smooth a voltage. The main circuit capacitor 10 includes a plurality of capacitor elements, and for example, has capacitance capable of smoothing a high frequency ripple and the like. In addition, the main circuit capacitor 10 may be configured as one capacitor element.

Figure 2:
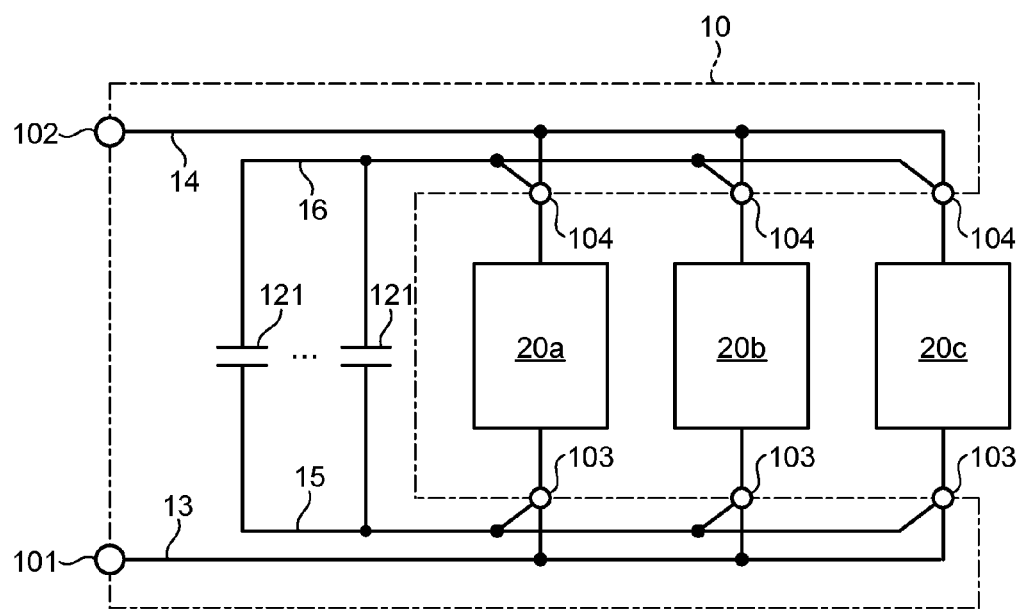
FIG. 2 is a diagram explaining the relationship between internal wirings of a main circuit capacitor according to a first embodiment.

Here, the configuration of the main circuit capacitor 10 will be described with reference to FIG. 2. FIG. 2 is a diagram explaining the relationship between internal wirings of the main circuit capacitor 10.

As illustrated in FIG. 2, the main circuit capacitor 10 includes a plurality of capacitor elements 121, 121, . . . , first wiring members 13 and 14, and second wiring members 15 and 16. The first wiring members 13 and 14 are wiring members that connect the DC power source 2 to the switching element sections 20a to 20c through the first connection portions 101 and 102 and second connection portions 103 and 104, respectively. Furthermore, the second wiring members 15 and 16 are wiring members that connect the capacitor elements 121, 121, . . . to the switching element sections 20a to 20c through the second connection portions 103 and 104.

In addition, as will be described later, the first wiring members 13 and 14 and the second wiring members 15 and 16 are arranged in a case of the main circuit capacitor 10, so that it is possible to shorten a wiring distance between the main circuit capacitor 10 and the switching element sections 20a to 20c.

Moreover, the first wiring members 13 and 14, which are paths through which a DC component mainly flows, and the second wiring members 15 and 16, which are paths through which an AC component mainly flows, are provided as separate members, so that heat generated by a current can be distributed. Consequently, the switching element sections 20a to 20c can be less affected by heat generated by the wiring members.

Figure 3:
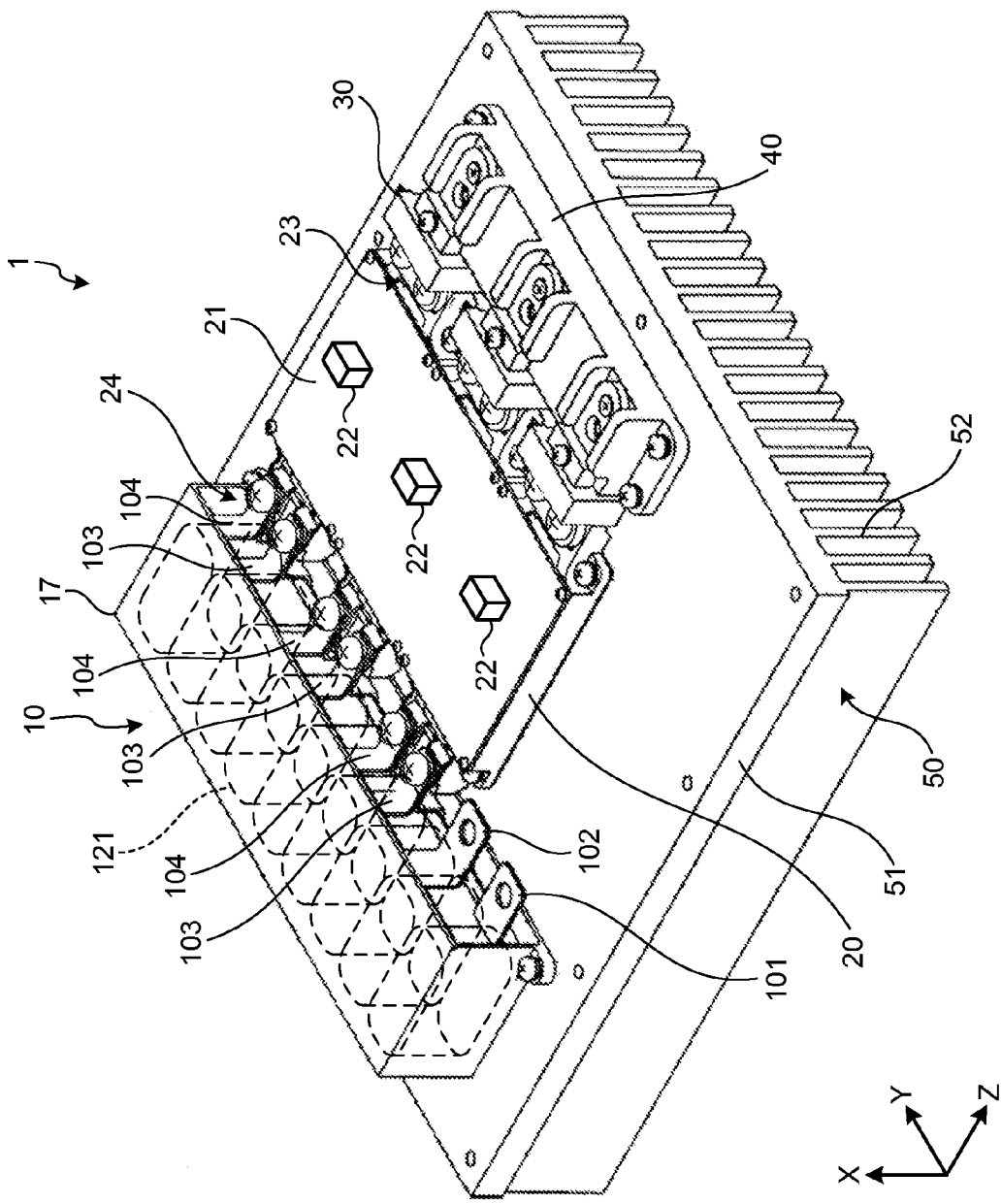
FIG. 3 is a perspective view illustrating the external appearance of a power conversion apparatus according to a first embodiment.

Hereinafter, an overall structure of the power conversion apparatus 1 will be described with reference to FIG. 3, and then a detailed structure of the main circuit capacitor 10 will be described. FIG. 3 is a perspective view illustrating the external appearance of the power conversion apparatus 1 according to the first embodiment. In addition, in FIG. 3, the capacitor elements 121 arranged in the main circuit capacitor 10 are indicated by dotted lines.

As illustrated in FIG. 3, the power conversion apparatus 1 according to the first embodiment is provided with a heat sink 50 including on a flat base 51 and a plurality of cooling fins 52 formed downward from the base 51. Furthermore, the power conversion apparatus 1 includes the main circuit capacitor 10, the inverter unit 20, the current detector 30, and the output terminal block 40, which are provided on the upper surface of the base 51 of the heat sink 50.

The inverter unit 20 includes a printed wiring board 21 provided thereon with the connectors 22 through which the driving signal is transmitted/received to/from the printed wiring board 21. Furthermore, a semiconductor switch provided on the rear surface of the printed wiring board 21 makes contact with the upper surface of the base 51 of the heat sink 50, and is cooled by the heat sink 50.

Furthermore, the inverter unit 20 is provided with DC input terminal sections 24 and AC output terminal sections 23. The main circuit capacitor 10 is connected to the DC input terminal sections 24 and output terminals of the output terminal block 40 are connected to the AC output terminal sections 23 through the current detector 30.

The main circuit capacitor 10 includes a box-shaped case 17 formed with an opening facing the inverter unit 20. In the case 17, the above-described capacitor elements 121, 121, . . . , first wiring members 13 and 14, and second wiring members 15 and 16 are arranged. A part of the first connection portions 101 and 102 and a part of the second connection portions 103 and 104 protrude from the opening of the case 17.

The second connection portions 103 and 104 serve as connection portions to each of the switching element sections 20a to 20c of the inverter unit 20 and are directly connected to input terminals of the DC input terminal sections 24. Consequently, it is possible to shorten the connection distance between the main circuit capacitor 10 and each of the switching element sections 20a to 20c.

Figure 4A:
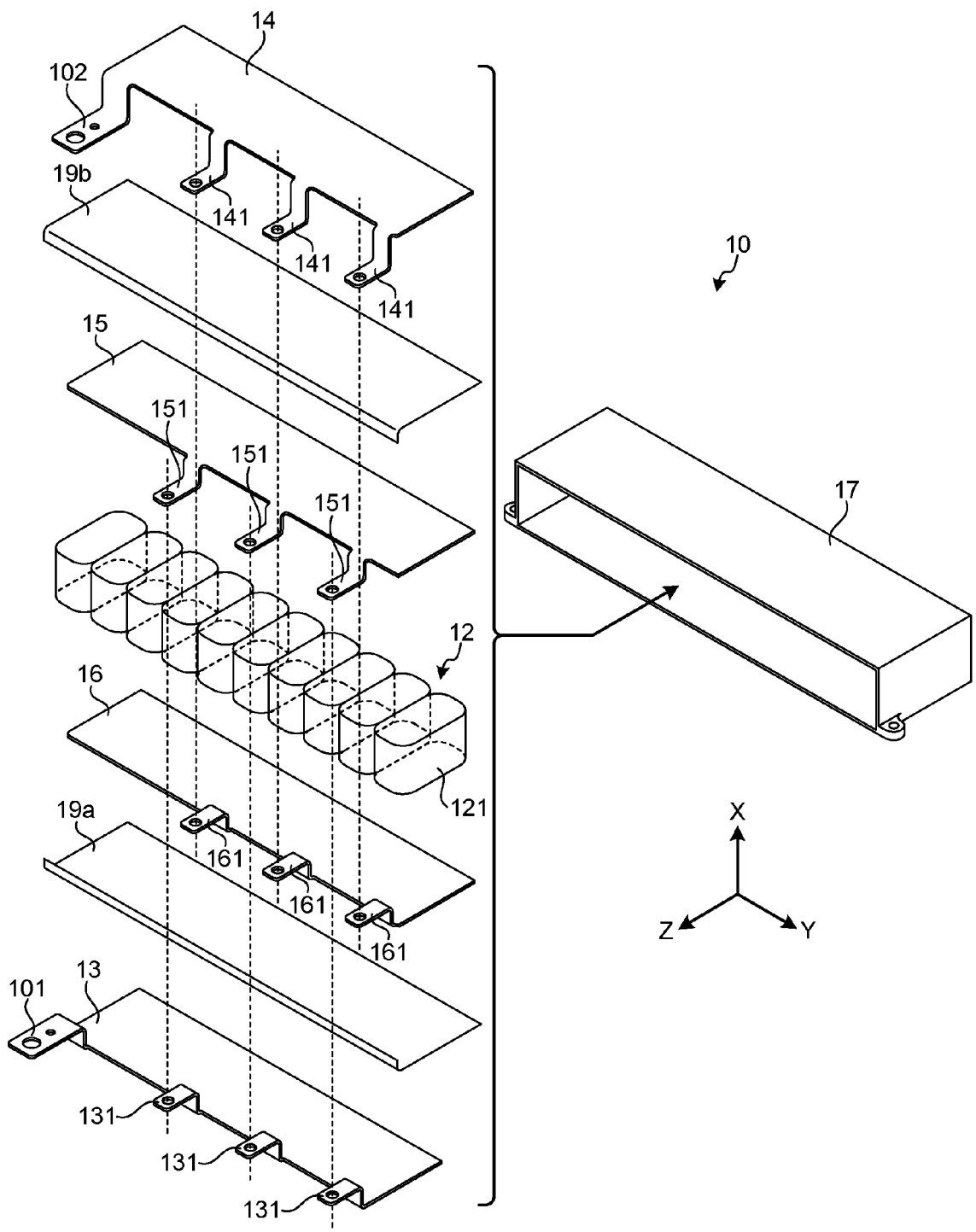
FIG. 4A is an exploded perspective view of a main circuit capacitor according to a first embodiment.
Figure 4C:
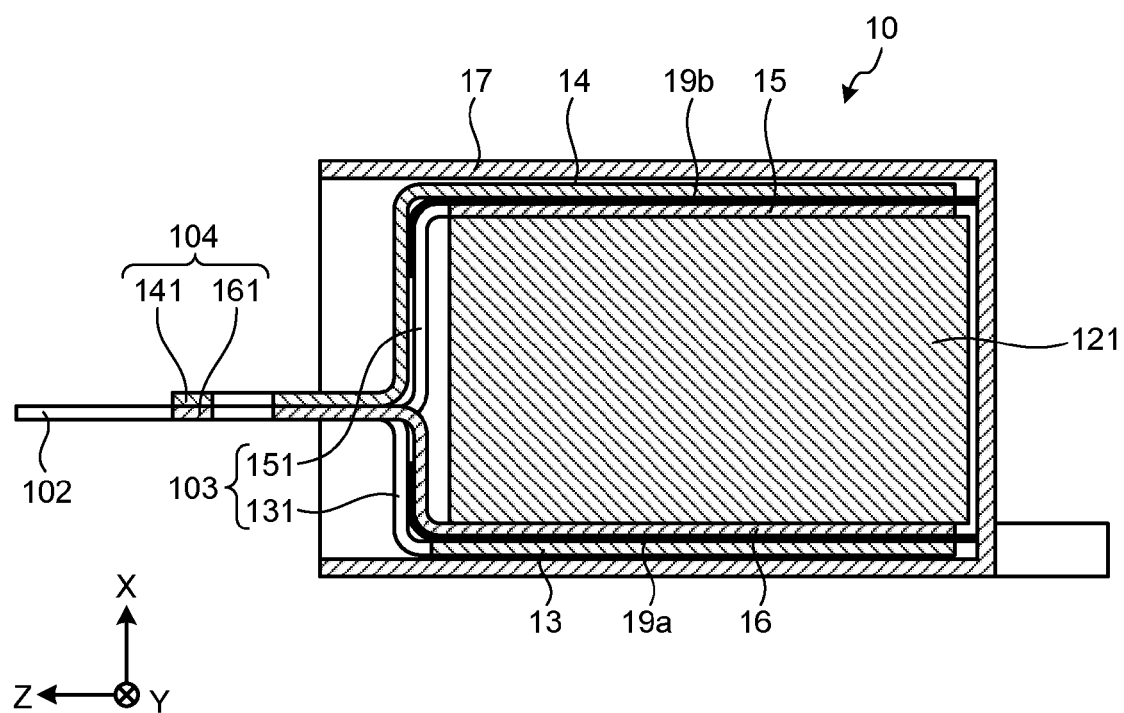
FIG. 4C is a sectional view taken along line A-A of FIG. 4B.

Hereinafter, the internal structure of the main circuit capacitor 10 capable of shortening the connection distance to each of the switching element sections 20a to 20c will be described in detail with reference to FIGS. 4A to 4C. FIG. 4A is an exploded perspective view of the main circuit capacitor 10 according to the first embodiment. In addition, in the following description, an X axis direction is defined as an upper and low direction, a Y axis direction is defined as a right and left direction, and a Z axis direction is defined as a front and rear direction. However, it is for illustrative purposes only and is not intended to limit the present embodiment.

As illustrated in FIG. 4A, the case 17 of the main circuit capacitor 10 is provided therein with a structure in which a plurality of members are stacked. In detail, the case 17 receives a structure in which the first wiring member 13, an insulating member 19a, the second wiring member 16, a capacitor element unit 12, the second wiring member 15, an insulating member 19b, and the first wiring member 14 are sequentially stacked.

In addition, a positive voltage of the DC power source 2 is applied to the first wiring member 14 and the second wiring member 16, and a negative voltage of the DC power source 2 is applied to the first wiring member 13 and the second wiring member 15. To facilitate the understanding of the description, they may be called 'a negative-side first wiring member 13,' 'a positive-side first wiring member 14,' 'a negative-side second wiring member 15,' and 'a positive-side second wiring member 16.'

The capacitor element unit 12 includes the plurality of capacitor elements 121, 121, . . . . A positive electrode and a negative electrode of each capacitor element 121 are vertically arranged, and the plurality of capacitor elements 121, 121, . . . are arranged to be transversely adjacent to one another. Here, when viewed from the drawing, it is assumed that the negative electrode is positioned at an upper surface side of each capacitor element 121 and the positive electrode is positioned at a lower surface side of each capacitor element 121.

The positive electrode of each capacitor element 121 is bonded to the upper surface of the positive-side second wiring member 16 by soldering and the like. The negative electrode of each capacitor element 121 is bonded to the lower surface of the negative-side second wiring member 15 by soldering and the like. The second wiring members 15 and 16, for example, are thin plate-like members such as copper bus bars with conductivity, and have sizes approximately the same as that of the upper surface of the capacitor element unit 12 in the front, rear, left and right directions.

The negative-side second wiring member 15 is provided at one end thereof with three second connection pieces 151, 151 and 151 each having an L shape when viewed from the side while being transversely spaced apart from one another at a predetermined interval. In the same manner, the positive-side second wiring member 16 is provided at one end thereof with three second connection pieces 161, 161 and 161 each having an L shape when viewed from the side while being transversely spaced apart from one another at a predetermined interval.

When the second wiring members 15 and 16 are received in the case 17, front ends of the six second connection pieces 151, 151, 151 and 161, 161, 161 protrude from the opening of the case 17.

The negative-side first wiring member 13 is stacked below the lower surface of the positive-side second wiring member 16 through the insulating member 19*a*. The positive-side first wiring member 14 is stacked above the upper surface of the negative-side second wiring member 15 through the insulating member 19*b*. The insulating members 19*a* and 19*b* are plate or film-like members with non-conductivity.

The positive-side second wiring member 16 and the negative-side first wiring member 13, which have polarities different from each other, are electrically insulated from each other by the insulating member 19*a*. Furthermore, the negative-side second wiring member 15 and the positive-side first wiring member 14, which have polarities different from each other, are electrically insulated from each other by the insulating member 19*b*.

The first wiring members 13 and 14, for example, are thin plate-like members with conductivity such as copper bus bars, and have sizes approximately the same as that of the upper surface of the capacitor element unit 12 in the front, rear, left and right directions. The negative-side first wiring member 13 is provided at one end thereof with one first connection portion 101 and three second connection pieces 131, 131 and 131 each having an L shape when viewed from the side while being transversely spaced apart from one another at a predetermined interval. Furthermore, the positive-side first wiring member 14 is provided at one end thereof with one first connection portion 102 and three second connection pieces 141, 141 and 141 each having an L shape when viewed from the side while being transversely spaced apart from one another at a predetermined interval.

The second connection pieces 131, 131 and 131 provided at one end of the negative-side first wiring member 13 are provided to overlap the second connection pieces 151, 151 and 151 provided at one end of the negative-side second wiring member 15. Furthermore, the second connection pieces 141, 141 and 141 provided at one end of the positive-side first wiring member 14 are provided to overlap the second connection pieces 161, 161 and 161 provided at one end of the positive-side second wiring member 16.

The second connection portions 103, 103 and 103 (refer to FIG. 3) are formed by the second connection pieces 131, 131 and 131 and the second connection pieces 151, 151 and 151, respectively. The second connection portions 104, 104 and 104 (refer to FIG. 3) are formed by the second connection pieces 141, 141 and 141 and the second connection pieces 161, 161 and 161, respectively. In addition, the second connection portions 103, 103 and 103 are spaced apart from the second connection portions 104, 104 and 104 at a predetermined interval such that they do not make contact with one another.

As described above, the negative-side first wiring member 13, the insulating member 19*a*, the positive-side second wiring member 16, the capacitor element unit 12, the negative-side second wiring member 15, the insulating member 19*b*, and the positive-side first wiring member 14 are stacked, thereby forming the second connection portions 103, 103, 103 and 104, 104, 104. The second connection portions 103, 103, 103 and 104, 104, 104 are connection portions in which connection portions between the main circuit capacitor 10 and the switching element sections 20*a* to 20*c* are integrally formed with connection portions between the DC power source 2 and the switching element sections 20*a* to 20*c*. Thus, the power conversion apparatus 1 can be fabricated in a small size and the assembling work efficiency thereof can be improved.

FIG. 4B is a see-through view explaining an inside of the case 17 of the main circuit capacitor 10. FIG. 4C is sectional view taken along line A-A of FIG. 4B. As illustrated in FIGS. 4B and 4C, the main circuit capacitor 10 has a structure which is assembled by stacking negative-side first wiring member 13, the insulating member 19*a*, the positive-side second wiring member 16, the capacitor element unit 12, the negative-side second wiring member 15, the insulating member 19*b*, and the positive-side first wiring member 14, wherein the structure is arranged in the case 17.

That is, the first wiring members 13 and 14 that connect the DC power source 2 to the switching element sections 20*a* to 20*c* and the second wiring members 15 and 16 that connect the capacitor element unit 12 to the switching element sections 20*a* to 20*c* are arranged in the case 17. The six connection portions 103, 103, 103 and 104, 104, 104 necessary for a connection to the switching element sections 20*a* to 20*c* are arranged at the opening-side of the case 17. Consequently, a wiring distance between the main circuit capacitor 10 and the switching element sections 20*a* to 20*c* can be shortened. As a result, it is possible to reduce the amount of generated heat and impedance in the second connection portions 103, 103, 103 and 104, 104, 104 which connect the main circuit capacitor 10 to the switching element sections 20*a* to 20*c*.

That is, a high frequency ripple current of a carrier frequency component flows through the wirings, which connect the main circuit capacitor 10 to the switching element sections 20*a* to 20*c*, by the operation of the switching element sections 20*a* to 20*c*, causing heat by a skin effect. When the amount of generated heat is large, it may affect the main circuit capacitor 10 and the switching element sections 20*a* to 20*c* which are peripheral circuits. Furthermore, when a high frequency ripple current flows between the main circuit capacitor 10 and the switching element sections 20*a* to 20*c*, since impedance of a wiring part should be considered as the length of the wiring part increases, a surge voltage may be generated at the time of switching of the switching element sections 20*a* to 20*c*.

On the other hand, in the power conversion apparatus 1, the capacitor elements 121 are connected to the switching element sections 20*a* to 20*c* through the second connection portions 103, 103, 103 and 104, 104, 104. Since the wiring distance between the main circuit capacitor 10 and the switching element sections 20*a* to 20*c* is short, the power conversion apparatus 1 can suppress a surge voltage or a large heat generation at the connection portions between the main circuit capacitor 10 and the switching element sections 20*a* to 20*c*. Furthermore, in the power conversion apparatus 1, the connection distance between the main circuit capacitor 10 and the switching element sections 20*a* to 20*c* is shortened, so that the weight and manufacturing cost of the power conversion apparatus 1 can be reduced.

Moreover, the first wiring members 13 and 14 and the second wiring members 15 and 16 are formed of a thin plate-like member and the insulating members 19*a* and 19*b* are also formed of a thin-plate or film-like member. Consequently, as illustrated in FIG. 4C, the effect on the length in the vertical direction (the X direction) of the main circuit capacitor 10 is small, and the main circuit capacitor 10 can be prevented from increasing in size.

In addition, in the power conversion apparatus 1, the sizes in the front, rear, left and right directions of the first wiring members 13 and 14, the second wiring members 15 and 16, and the insulating members 19a and 19b are approximately the same as the sizes of the upper and lower surfaces of the capacitor element unit 12. Thus, in the power conversion apparatus 1, for example, it is possible to suppress the effect on the length in the front and rear directions and right and left directions of the case 17.

Furthermore, in the power conversion apparatus 1, the sizes in the front, rear, left and right directions of the first wiring members 13 and 14 and the second wiring members 15 and 16 are approximately the same as the sizes of the upper and lower surfaces of the capacitor element unit 12. Thus, in the power conversion apparatus 1, impedance of the first wiring members 13 and 14 and the second wiring members 15 and 16 can be more effectively reduced. Consequently, in the power conversion apparatus 1, a surge voltage or a large heat generation can be more effectively suppressed.

Furthermore, in the power conversion apparatus 1, the first wiring members 13 and 14, which are paths through which a DC component mainly flows, and the second wiring members 15 and 16, which are paths through which an AC component mainly flows, are provided as separate members, so that heat generated by a current can be distributed. Consequently, in the power conversion apparatus 1, the switching element sections 20a to 20c can be less affected by heat generated by the wiring members.

Second Embodiment

Next, a power conversion apparatus according to the second embodiment will be described. The power conversion apparatus according to the second embodiment is substantially identical to the power conversion apparatus 1 according to the first embodiment, except for the configuration of a main circuit capacitor. Hereinafter, the main circuit capacitor of the power conversion apparatus according to the second embodiment will be described in detail with reference to FIGS. 5A to 5C.

Figure 5A:
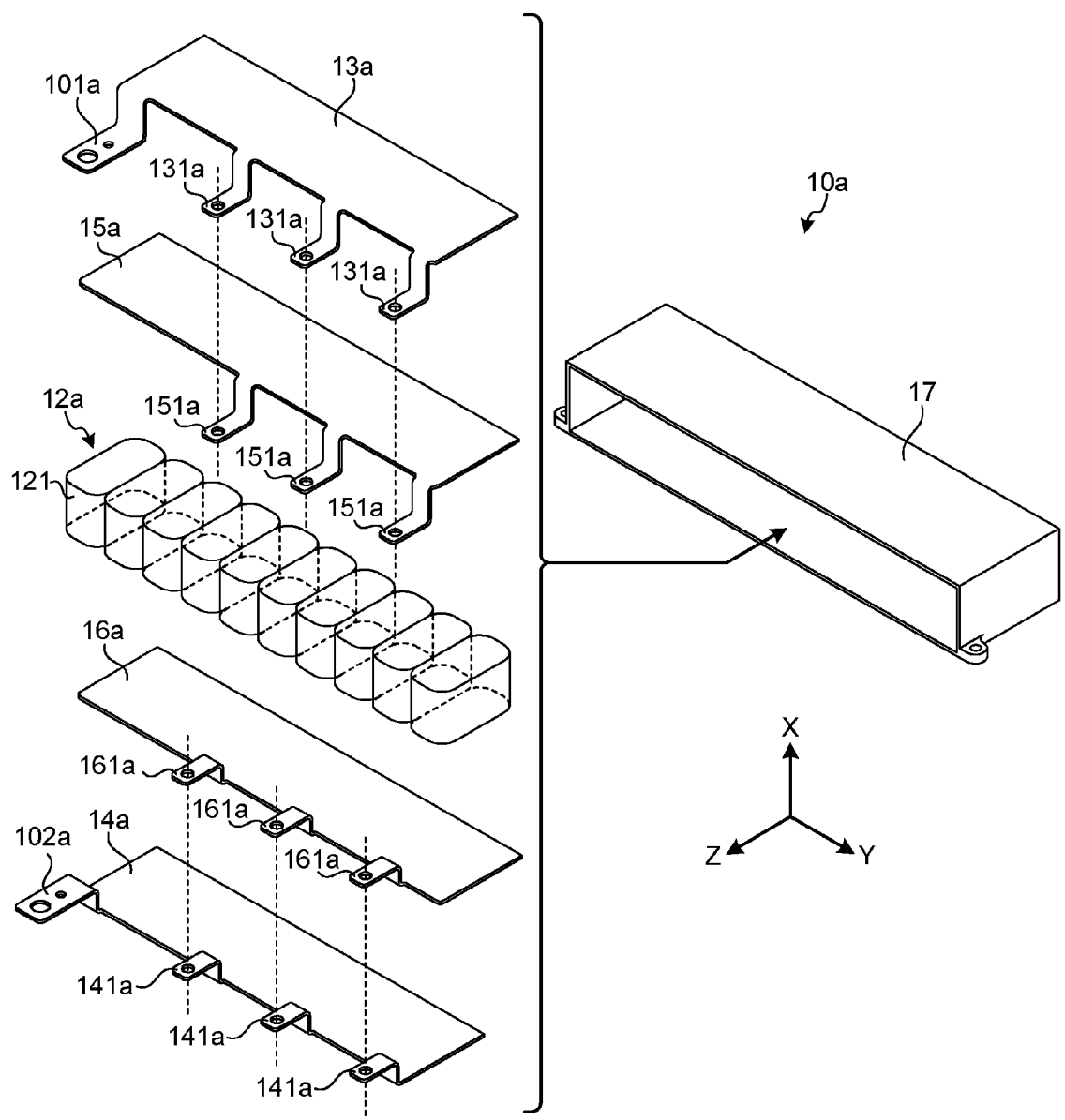
FIG. 5A is an exploded perspective view of a main circuit capacitor according to a second embodiment.
Figure 5C:
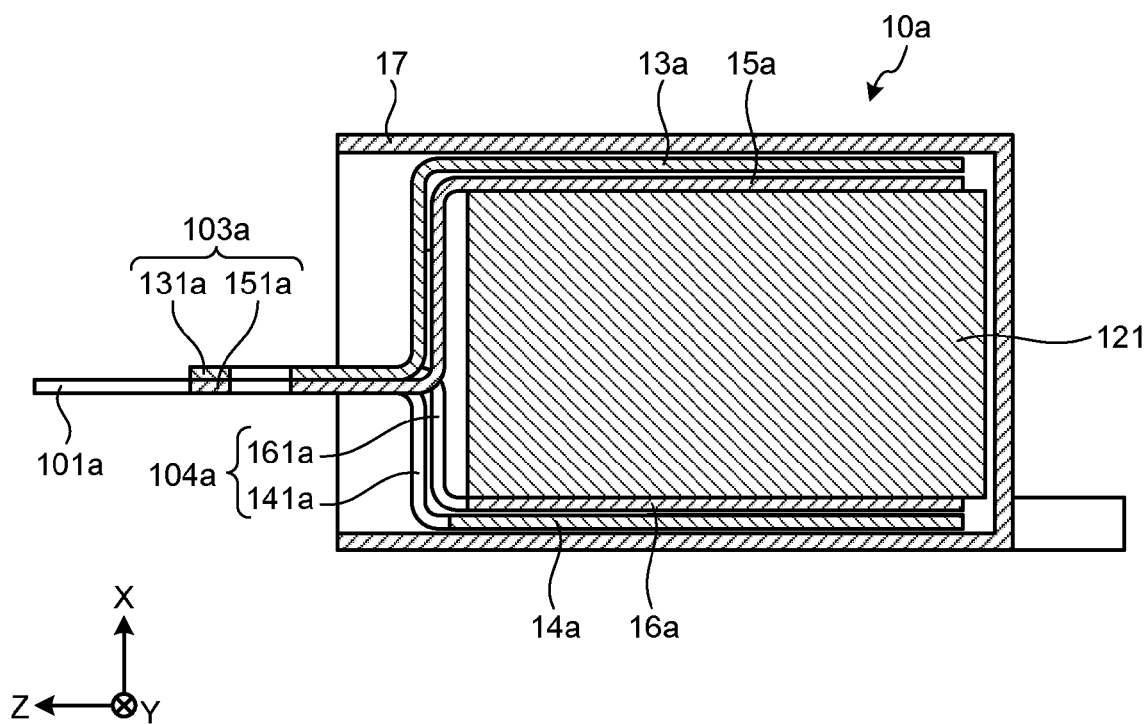
FIG. 5C is a sectional view taken along line B-B of FIG. 5B.

FIG. 5A is an exploded perspective view of a main circuit capacitor 10a according to the second embodiment, FIG. 5B is a see-through view explaining an inside of a case 17 of the main circuit capacitor 10a, and FIG. 5C is sectional view taken along line B-B of FIG. 5B.

As illustrated in FIG. 5A, the main circuit capacitor 10a according to the second embodiment is assembled by stacking a positive-side first wiring member 14a, a positive-side second wiring member 16a, a capacitor element unit 12a, a negative-side second wiring member 15a, and a negative-side first wiring member 13a, and is arranged in the case 17.

The second wiring members 15a and 16a have the same configurations as those of the second wiring members 15 and 16 according to the first embodiment illustrated in FIG. 4A, except that formation positions of second connection pieces 151a and 161a are different from those of the second connection pieces 151 and 161. Similarly to the first wiring members 13 and 14 and the second wiring members 15 and 16 according to the first embodiment illustrated in FIG. 4A, the first wiring members 13a and 14a and the second wiring members 15a and 16a, for example, are thin plate-like members with conductivity such as copper bus bars, and have sizes approximately the same as that of the upper surface of the capacitor element unit 12a.

The negative-side first wiring member 13a is arranged in opposition to the first wiring member 13 according to the first embodiment illustrated in FIG. 4A. The negative-side first wiring member 13a is provided at one end thereof with one first connection portion 101a and three second connection pieces 131a, 131a and 131a each having an L shape when viewed from the side while being transversely spaced apart from one another at a predetermined interval. Furthermore, the positive-side first wiring member 14a is arranged in opposition to the first wiring member 14 according to the first embodiment illustrated in FIG. 4A. The positive-side first wiring member 14a is provided at one end thereof with one first connection portion 102a and three second connection pieces 141a, 141a and 141a each having an L shape when viewed from the side while being transversely spaced apart from one another at a predetermined interval.

The second connection pieces 131a, 131a and 131a provided at one end of the negative-side first wiring member 13a are provided to overlap the second connection pieces 151a, 151a and 151a provided at one end of the negative-side second wiring member 15a. Furthermore, the second connection pieces 141a, 141a and 141a provided at one end of the positive-side first wiring member 14a are provided to overlap the second connection pieces 161a, 161a and 161a provided at one end of the positive-side second wiring member 16a.

The second connection portions 103a, 103a and 103a (refer to FIG. 5B) are formed by the second connection pieces 131a, 131a and 131a and the second connection pieces 151a, 151a and 151a, respectively. The second connection portions 104a, 104a and 104a (refer to FIG. 5B) are formed by the second connection pieces 141a, 141a and 141a and the second connection pieces 161a, 161a and 161a, respectively. In addition, the second connection portions 103a, 103a and 103a are spaced apart from the second connection portions 104a, 104a and 104a at a predetermined interval such that they do not make contact with one another.

As described above, differently from the main circuit capacitor 10 according to the first embodiment, in the main circuit capacitor 10a according to the second embodiment, the positive-side and the negative-side first wiring members are arranged at different positions. That is, the main circuit capacitor 10 according to the first embodiment has a structure in which the first wiring member and the second wiring member with different polarities of applied voltages are stacked via the insulating member. However, in the main circuit capacitor 10a according to the second embodiment, the first wiring member and the second wiring member with the same polarity of applied voltages are stacked.

With such a configuration, as illustrated in FIG. 5C, no insulating member is required between the first wiring member 13a and the second wiring member 15a, and between the first wiring member 14a and the second wiring member 16a. Consequently, the manufacturing cost is reduced, and the main circuit capacitor 10a can be further fabricated in a small size by the thicknesses of the insulating members 19a and 19b, as compared with the main circuit capacitor 10 illustrated in FIG. 4B.

Furthermore, in the power conversion apparatus according to the second embodiment, similarly to the power conversion apparatus 1 according to the first embodiment, it is possible to shorten the wiring distance between the main circuit capacitor 10 and the switching element sections 20a to 20c. Consequently, in the power conversion apparatus according to the second embodiment, it is possible to reduce the amount of generated heat and impedance at connection portions between the main circuit capacitor 10 and each of the switching element sections 20a to 20c.

Third Embodiment

Next, a power conversion apparatus according to the third embodiment will be described. The power conversion apparatus according to the third embodiment has the same configuration as that of the power conversion apparatus 1 illustrated in FIG. 3, except for a difference in the configuration of connection places of a DC power source 2.

Figure 6:
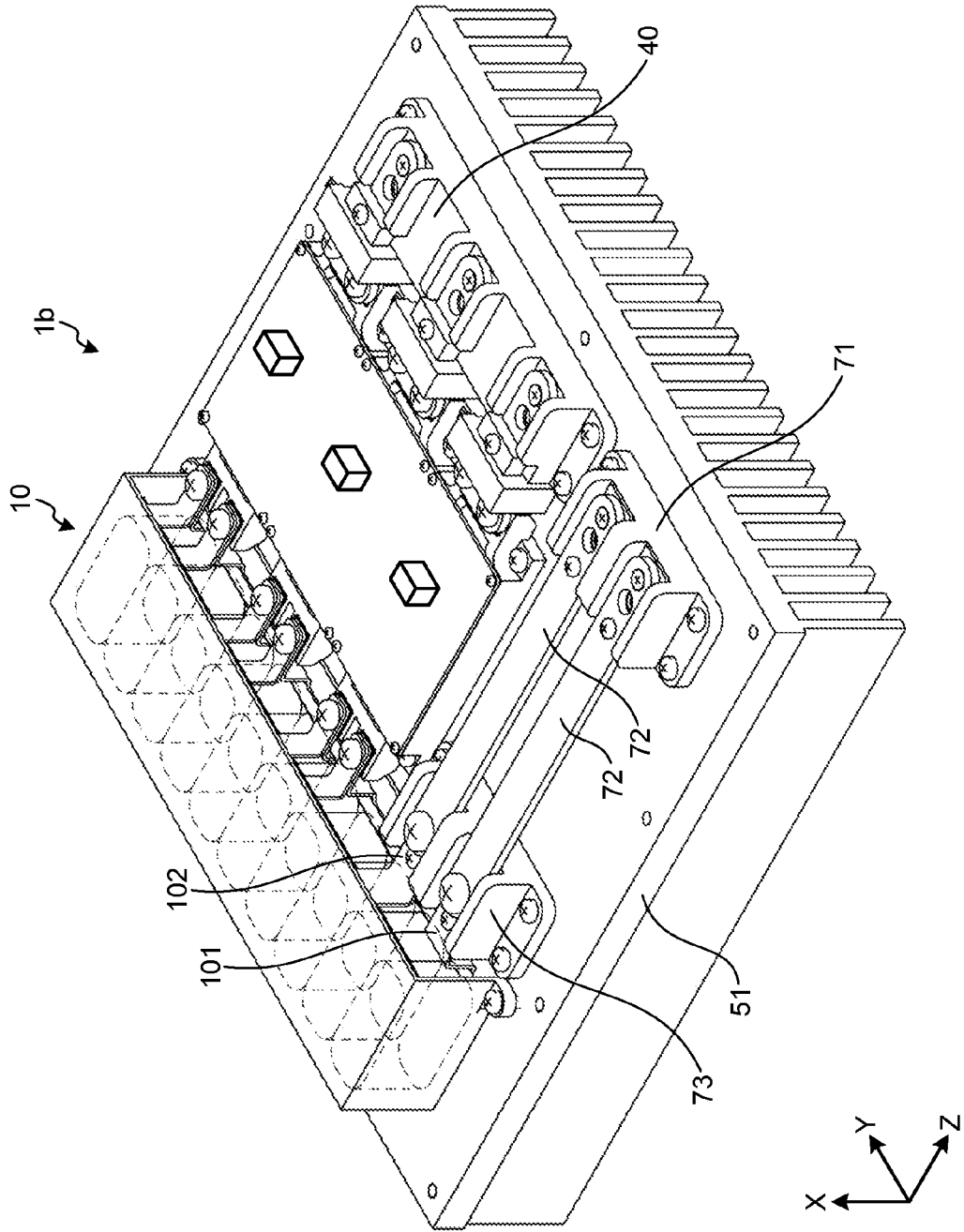
FIG. 6 is a perspective view illustrating the external appearance of a power conversion apparatus according to a third embodiment.

FIG. 6 is a perspective view illustrating the external appearance of a power conversion apparatus 1b according to the third embodiment. As illustrated in FIG. 6, in the power conversion apparatus 1b, an input terminal block 71 and a connection terminal block 73 are provided on the upper surface of a base 51. The input terminal block 71 is provided adjacent to an output terminal block 40 and the connection terminal block 73 is provided at a position facing first connection portions 101 and 102 protruding from a main circuit capacitor 10.

In the power conversion apparatus 1b, a pair of wiring members 72 and 72 with conductivity are installed between the input terminal block 71 and the connection terminal block 73, and end portions of the connection terminal block 73 in the wiring members 72 and 72 are connected to the first connection portions 101 and 102, respectively.

In this way, in the power conversion apparatus 1b, since an end portion of the input terminal block 71 in the wiring members 72 serves as a connection portion to the DC power source 2, an output part of an AC voltage and an input part of a DC voltage can be provided adjacent to each other. Consequently, in the power conversion apparatus 1b, for example, when wiring cables are connected to the output part of the AC voltage and the input part of the DC voltage, the wiring cables can be easily installed. Furthermore, in the power conversion apparatus 1b, in addition to the output part of the AC voltage, the input part of the DC voltage can be arranged close to one side of the base 51. Thus, in the power conversion apparatus 1b, for example, when a wiring cable is connected to the input part of the DC voltage, it is possible to prevent the wiring cable from making contact with a heat sink 50 where heat is generated.

Fourth Embodiment

Figure 7:
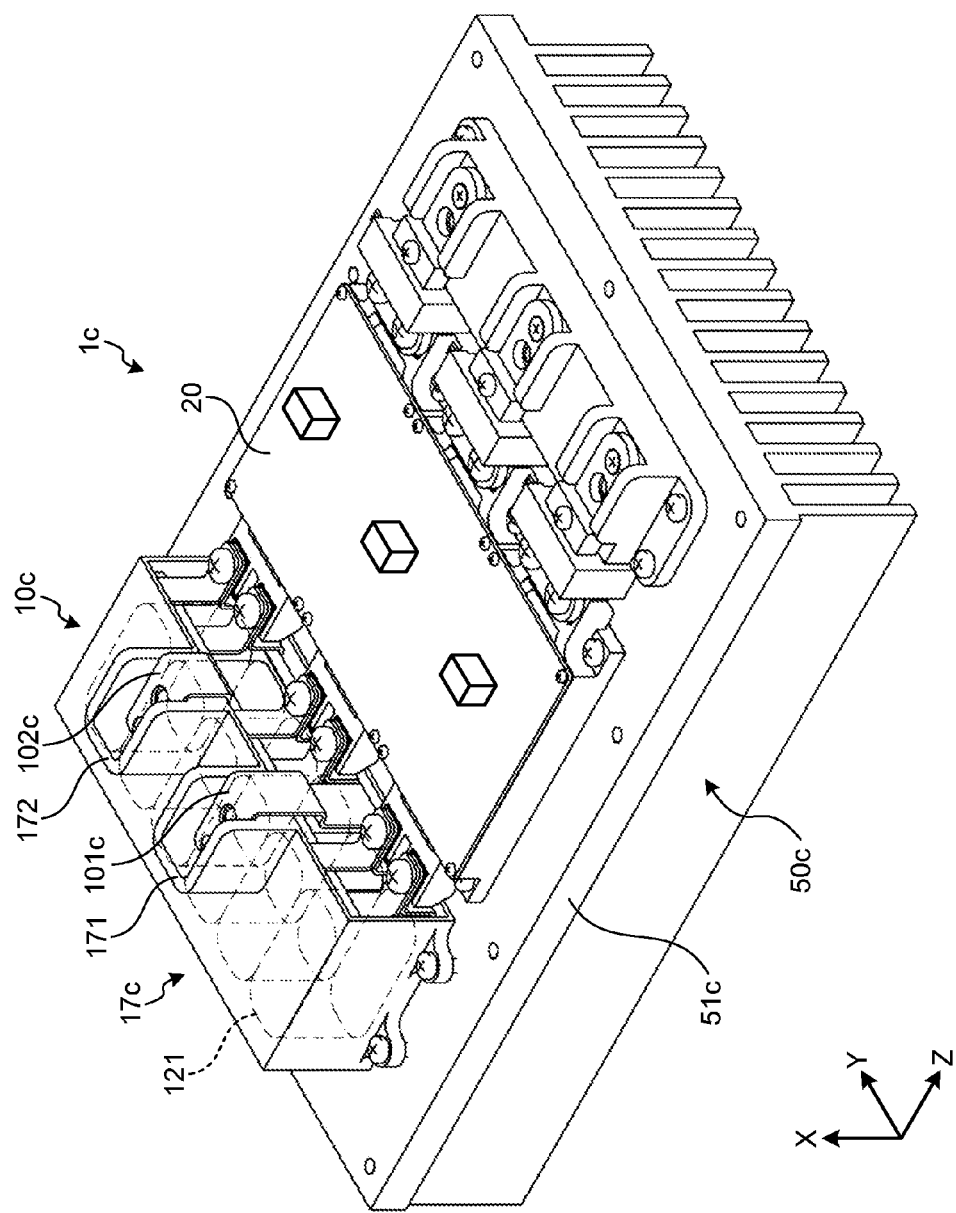
FIG. 7 is a perspective view illustrating the external appearance of a power conversion apparatus according to a fourth embodiment.

Next, a power conversion apparatus 1c according to the fourth embodiment will be described. FIG. 7 is a perspective view illustrating the external appearance of the power conversion apparatus 1c according to the fourth embodiment. In addition, in FIG. 7, capacitor elements 121 arranged in the main circuit capacitor 10c are indicated by dotted lines.

The power conversion apparatus 1c has the same configuration as that of the power conversion apparatus 1 illustrated in FIG. 3, except that the configuration of the main circuit capacitor 10c and a size of a heat sink 50c are different from those of the power conversion apparatus 1 illustrated in FIG. 3. Hereinafter, the configuration of the main circuit capacitor 10c and the size of the heat sink 50c will be described.

As illustrated in FIG. 7, in power conversion apparatus 1c, a pair of input terminal blocks 171 and 172 are provided on the upper surface of a case 17c of the main circuit capacitor 10c, and first connection portions 101c and 102c serving as connection portions to the DC power source 2 (refer to FIG. 1) are provided on the upper surfaces of the input terminal blocks 171 and 172. The internal structure of the main circuit capacitor 10c will be described in detail later with reference to FIGS. 8A to 8C.

As described above, in power conversion apparatus 1c, the first connection portions 101c and 102c are provided on the upper surface of the case 17c. Consequently, in power conversion apparatus 1c, a space occupied by the main circuit capacitor 10c on the upper surface of a base 51c is reduced, as compared with the structure (refer to FIG. 3) in which the first connection portions 101 and 102 are provided adjacent to the second connection portions 103 and 104 in the right and left direction.

In this way, since the power conversion apparatus 1c can be configured by the heat sink 50c provided with the base 51c having an upper surface smaller than that of the base 51 illustrated in FIG. 3, the power conversion apparatus 1c can be further fabricated in a small size as compared with the power conversion apparatus 1.

Figure 8A:
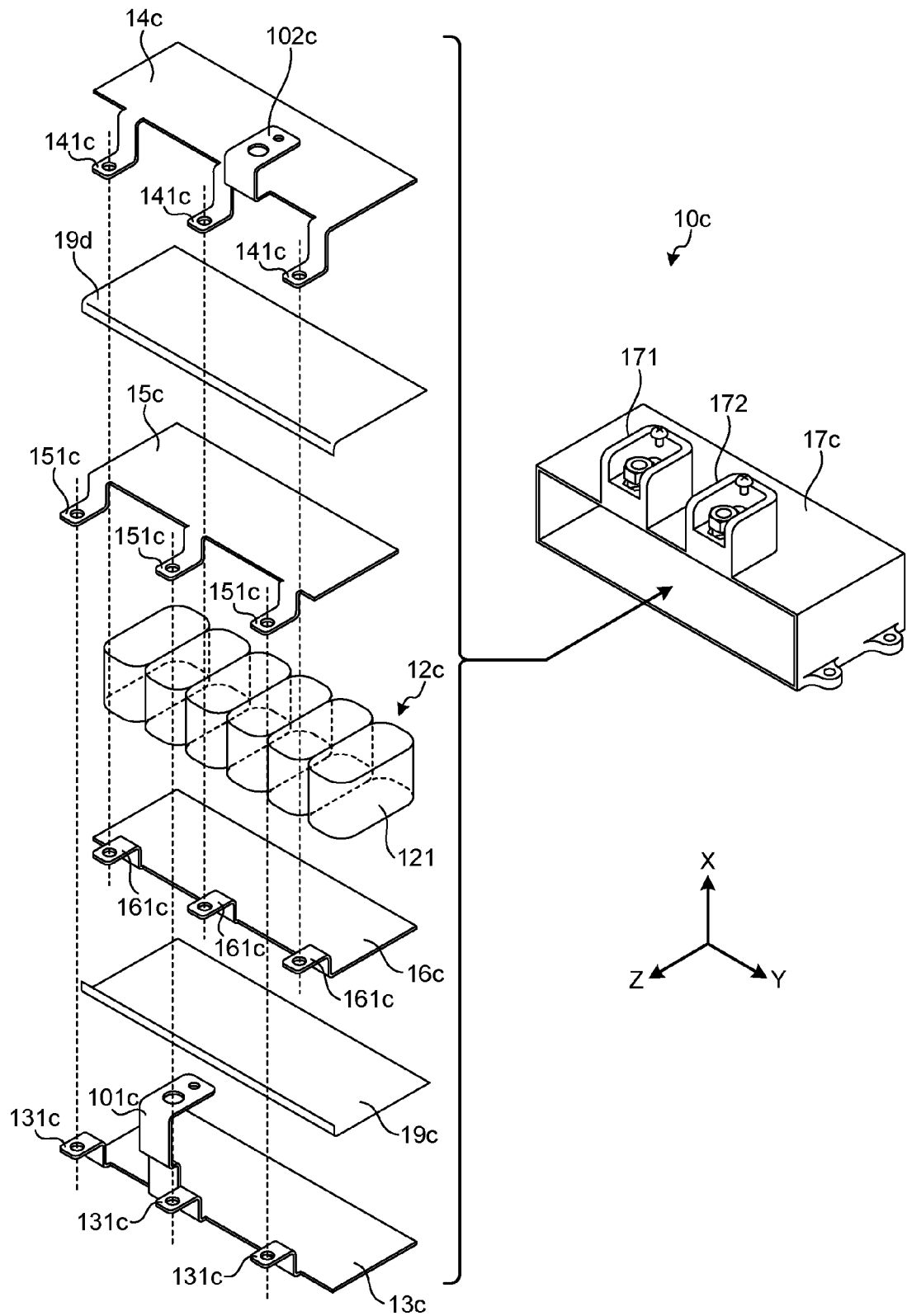
FIG. 8A is an exploded perspective view of a main circuit capacitor according to a fourth embodiment.
Figure 8B:
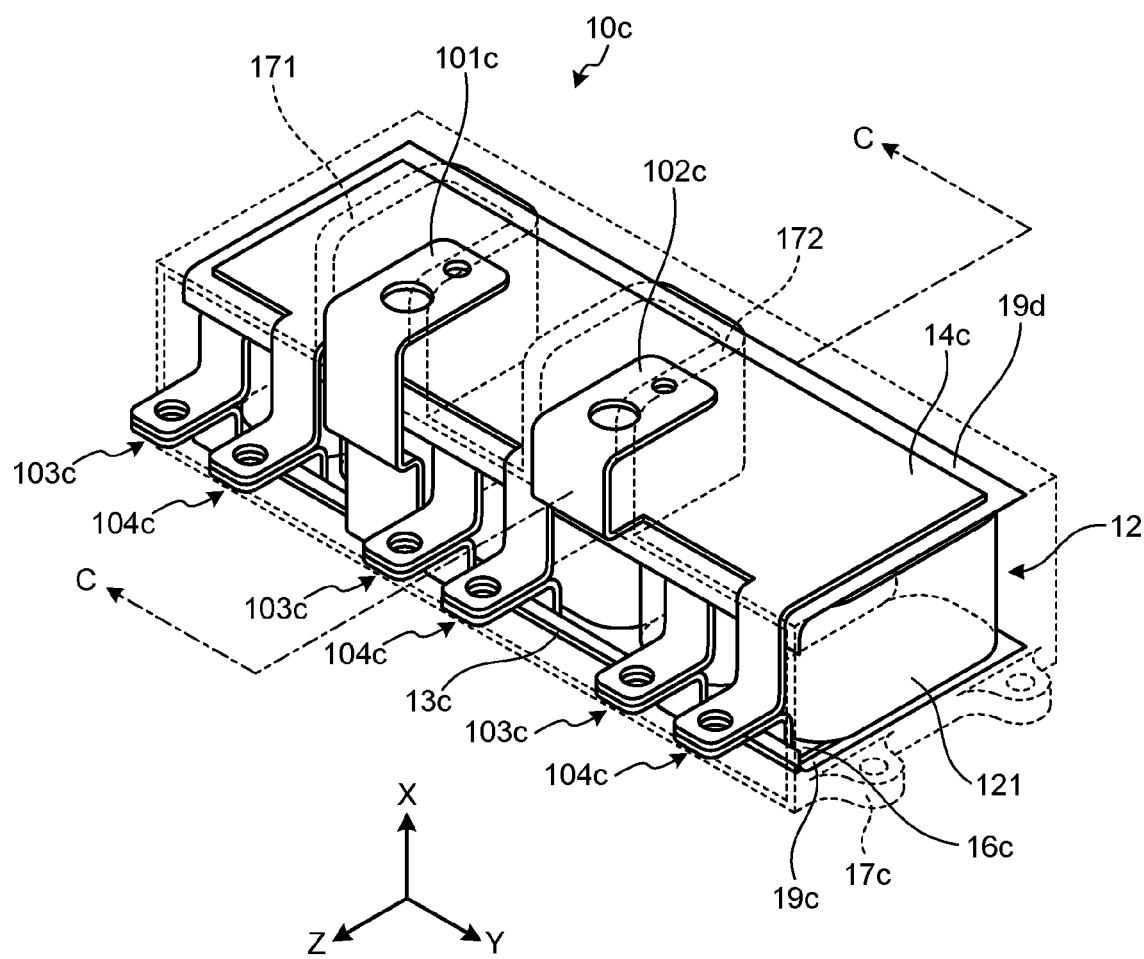
FIG. 8B is a see-through view explaining an inside of a case of a main circuit capacitor according to a fourth embodiment.
Figure 8C:
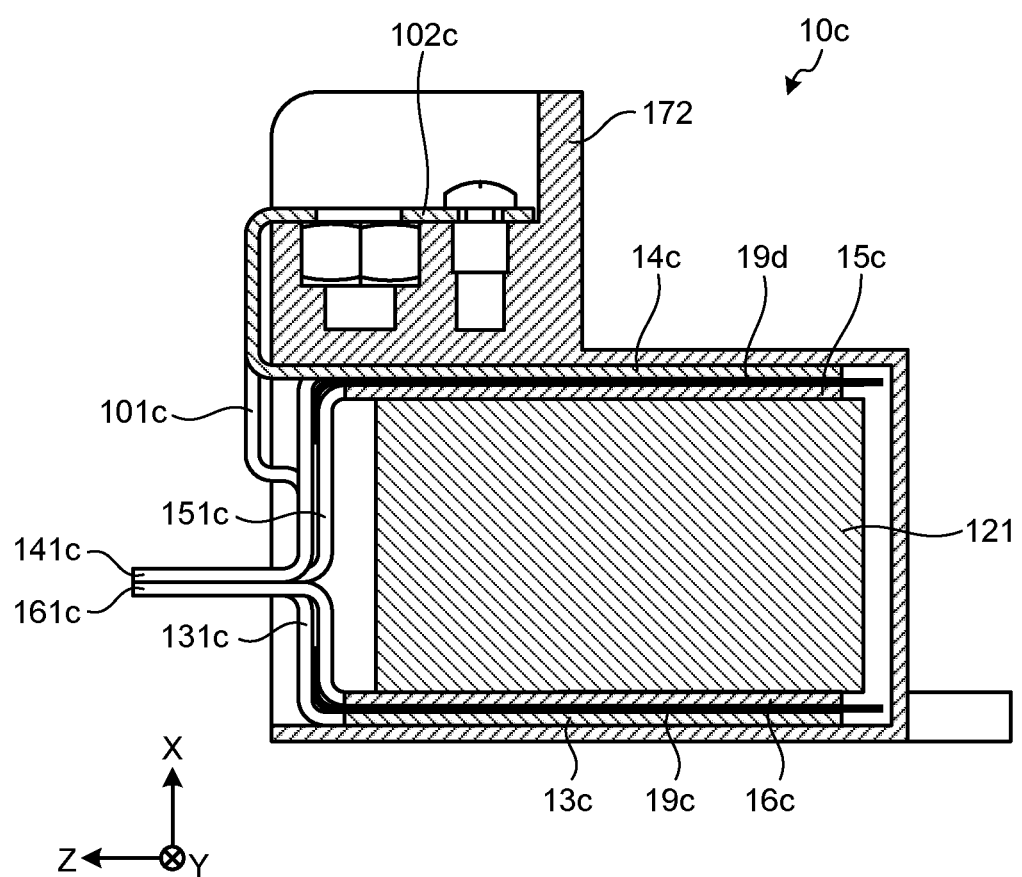
FIG. 8C is a sectional view taken along line C-C of FIG. 8B.

Next, the main circuit capacitor 10c will be described with reference to FIG. 8A. FIG. 8A is an exploded perspective view of the main circuit capacitor 10c according to the fourth embodiment. FIG. 8B is a see-through view explaining an inside of the case 17c of the main circuit capacitor 10c according to the fourth embodiment. FIG. 8C is sectional view taken along line C-C of FIG. 8B.

As illustrated in FIG. 8A, the case 17c of the main circuit capacitor 10c receives a structure in which a plurality of members are stacked. A stack structure in the main circuit capacitor 10c is basically identical to the stack structure of the main circuit capacitor 10 according to the first embodiment. That is, the case 17c receives a structure in which a first wiring member 13c, an insulating member 19c, a second wiring member 16c, a capacitor element unit 12c, a second wiring member 15c, an insulating member 19d, and a first wiring member 14c are stacked. The insulating members 19c and 19d are plate or film-like members with conductivity, similarly to the insulating members 19a and 19b.

In the main circuit capacitor 10c, since front end portions of the first connection portions 101c and 102c are arranged on the input terminal blocks 171 and 172 provided on the upper surface of the case 17c, the first connection portions 101c and 102c and the first wiring members 13c and 14c are formed as follows.

The first wiring member 13c is provided at one end thereof with one first connection portion 101c and three second connection pieces 131c, 131c and 131c. The first connection portion 101c is provided between the second connection pieces 131c and 131c, and has a substantially J shape formed by folding an intermediate portion thereof backward when viewed from the sectional side such that the front end portion of the first connection portion 101c is positioned on the upper surface of the case 17c as illustrated in FIG. 8C when the first wiring member 13c is received in the case 17c.

As illustrated in FIG. 8C, the first connection portion 101c extends approximately at a right angle from one end of the first wiring member 13c and is folded backward in the substantially J shape when viewed from the sectional side, so that the front end portion of the first connection portion 101c is positioned on the upper surface of the case 17c. Consequently, in the power conversion apparatus 1c, it is possible to reduce a portion of the first connection portion 101c, which protrudes from the opening of the case 17c. As a result, in the power conversion apparatus 1c, it is possible to expand a space between the main circuit capacitor 10c and an inverter unit 20, and to further reduce the probability of a contact between the first connection portion 101c and other members.

Furthermore, in the same manner as the above, the first wiring member 14c is provided at one end thereof with one first connection portion 102c and three second connection pieces 141c, 141c and 141c. The first connection portion 102c is provided between the second connection pieces 141c and 141c, and has a substantially J shape formed by folding an intermediate portion thereof backward when viewed from the sectional side such that the front end portion of the first connection portion 102c is positioned on the upper surface of the case 17c as illustrated in FIG. 8C when the first wiring member 14c is received in the case 17c. As described above, since the first connection portion 102c is provided between the second connection pieces 141c, the width in the right and left directions of the first wiring member 14c can be reduced in the power conversion apparatus 1c.

In addition, the second connection pieces 131c, 131c and 131c are provided to overlap second connection pieces 151c, 151c and 151c provided to one end of the second wiring member 15c, thereby forming second connection portions 103c, 103c and 103c as illustrated in FIG. 8B. Furthermore, the second connection pieces 141c, 141c and 141c are provided to overlap second connection pieces 161c, 161c and 161c provided to one end of the second wiring member 16c, thereby forming second connection portions 104c, 104c and 104c as illustrated in FIG. 8B.

As described above, in the main circuit capacitor 10c according to the fourth embodiment, the first connection portions 101c and 102c are drawn out between the second connection portions 103c and 104c and positioned on a plane different from that of the second connection portions 103c and 104c. Thus, in the main circuit capacitor 10c, a space occupied by the main circuit capacitor 10c on the upper surface of the base 51c is reduced, so that the main circuit capacitor 10c can be further fabricated in a small size, as compared with the power conversion apparatus 1 illustrated in FIG. 3, in which the first connection portions 101c and 102c and the second connection portions 103c and 104c are arranged in a row on the same plane.

In the fourth embodiment, the first connection portions 101c and 102c are drawn out from the front side (the opening side) of the case 17c toward the upper surface of the case 17c. However, they may be drawn out from the lateral side or rear side of the case 17c toward the upper surface of the case 17c.

That is, even when the first connection portions 101c and 102c are drawn out from arbitrary places of the case 17c, they are folded and bent toward the upper surface of the case 17c along the external appearance of the case 17c, so that a space occupied by the main circuit capacitor 10c on the upper surface of the base 51c is reduced.

Furthermore, in the power conversion apparatuses according to the third and fourth embodiments, the main circuit capacitors having a structure in which the first wiring member and the second wiring member with different polarities of applied voltages are stacked via the insulating member have been described as an example. However, the main circuit capacitor is not limited thereto. That is, similarly to the power conversion apparatus 10a according to the second embodiment, the structure in which the first wiring member and the second wiring member with the same polarity of applied voltages are stacked can be applied to the third and fourth embodiments.

Furthermore, in the power conversion apparatuses according to the first to fourth embodiments, the negative electrode is positioned at the upper surface side of each capacitor element 121 and the positive electrode is positioned at the lower surface side of each capacitor element 121. However, the positive electrode may be positioned at the upper surface side of each capacitor element 121 and the negative electrode is positioned at the lower surface side of each capacitor element 121. In such a case, the first connection portions have polarities opposite to those in the examples according to the first to fourth embodiments. Furthermore, electrodes are provided to the upper surface side and the lower surface side of each capacitor element 121. However, the positions of the electrodes are not limited thereto. For example, the positive electrode and the negative electrode may be provided to anyone of the upper surface side and the lower surface side of each capacitor element 121. In such a case, all the first wiring members and the second wiring members are stacked at the side where the electrodes are provided, so that the first wiring members and the second wiring members can be arranged in the case.

Furthermore, in the power conversion apparatuses according to the first to fourth embodiments, the case of the main circuit capacitor is formed at the whole front side thereof with an opening. However, the opening may be formed only in a part of the front side of the case such that only the first connection portion and the second connection portion are exposed. Furthermore, in the power conversion apparatuses according to the first to fourth embodiments, the first connection portion and the second connection portion are configured to protrude from the case. However, for example, if there is no problem in an assembling process and the like, the first connection portion and the second connection portion may not protrude therefrom.

Furthermore, in the power conversion apparatuses according to the first to fourth embodiments, an example in which the first wiring member and the second wiring member are configured by a copper bus bar has been described. However, the present embodiment is not limited to the copper bus bar if the first wiring member and the second wiring member are configured by a thin plate-like conductive member. Furthermore, the insulating members 19a to 19d may be formed of materials if the materials can maintain an insulation property in the range of the performance of the power conversion apparatus.

Furthermore, in the power conversion apparatuses according to the first to fourth embodiments, all second connection portions are configured to protrude from the same direction. However, some of the second connection portions may be configured to protrude from other directions. Furthermore, in the power conversion apparatuses according to the first to fourth embodiments, an example in which the inverter unit for converting a DC voltage into an AC voltage is used as the switching circuit has been described. However, instead of the inverter unit, a converter unit for converting an AC voltage into a DC voltage may be arranged.

In addition, the technology disclosed in the present embodiment can also be applied to a power conversion apparatus that converts a DC voltage into a multi-phase AC voltage other than a three-phase AC voltage. Furthermore, the technology disclosed in the present embodiment can also be applied to a power conversion apparatus that outputs an AC voltage to an arbitrary load other than a three-phase motor.

Furthermore, in the previous embodiments, a case where each second connection piece is formed in an L shape when viewed from the side view has been described. However, the second connection piece may have various shapes if it protrudes from the case of the main circuit capacitor.

For example, the second connection pieces provided to the first wiring member and the first wiring member may be formed on the same plane, and the second connection pieces provided to the second wiring member and the first wiring member may be formed on the same plane. In such a case, the DC input terminal sections of the inverter unit are held by the second connection pieces formed at opposite positions and having the same polarity, so that the main circuit capacitor is connected to the inverter unit.

The first wiring member or the second wiring member provided at one end thereof with the second connection pieces is easily formed by die-cutting without using a press process in the manufacturing process. Consequently, the number of manufacturing steps can be reduced.

According to an embodiment of a power conversion apparatus disclosed in the present invention, it is possible to shorten a connection distance between a main circuit capacitor and a switching circuit.

What is claimed is:

1. A power conversion apparatus comprising:
a switching circuit including switching element units each of which includes semiconductor switches;
a main circuit capacitor connected between a DC power source and the switching circuit; and
an output terminal block that outputs an AC voltage converted by the switching circuit,
wherein the main circuit capacitor includes:
a capacitor element unit that includes capacitor elements;
a first wiring member that includes positive and negative wiring members to connect the DC power source to the switching circuit; and
a second wiring member that includes positive and negative wiring members to connect the capacitor element to the switching circuit,
wherein the capacitor element unit, the first wiring member, and the second wiring member are received in a case,
wherein the capacitor element unit is sandwiched between the positive and negative wiring members of the second wiring member,
wherein each of the positive and negative members of the first wiring member includes first connection pieces that are connected to the respective switching element units and each of the positive and negative members of the second wiring member includes second connection pieces that are connected to the respective switching element units,
wherein the first connection pieces and the second connection pieces form connection portions that correspond to the respective switching element units, and
wherein a first current path that is a current path between the DC power source and the switching circuit and a second current path that is a current path between the capacitor element unit and the switching circuit are merged in the connection portions.

2. The power conversion apparatus according to claim 1, wherein
the first and second wiring members are provided as separate members.

3. The power conversion apparatus according to claim 1, wherein
the capacitor element unit and the second wiring unit are sandwiched between the positive and negative wiring members of the first wiring member.

4. The power conversion apparatus according to claim 3, wherein
the first positive wiring member and the second negative wiring member are stacked via a first insulating member, and
the first negative wiring member and the second positive wiring member are stacked via a second insulating member.

5. A power conversion apparatus comprising:
a switching circuit including semiconductor switches;
a main circuit capacitor connected between a DC power source and the switching circuit; and
an output terminal block that outputs an AC voltage converted by the switching circuit,
wherein the main circuit capacitor includes:
a capacitor element unit that includes capacitor elements;
a first wiring member that includes positive and negative wiring members to connect the DC power source to the switching circuit; and
a second wiring member that includes positive and negative wiring members to connect the capacitor element to the switching circuit,
wherein the capacitor element unit, the first wiring member, and the second wiring member are received in a case,
wherein the capacitor element unit is sandwiched between the positive and negative wiring members of the second wiring member, and the capacitor element unit and the second wiring unit are further sandwiched between the positive and negative wiring members of the first wiring member,
wherein one of the positive and negative wiring members of the first wiring member and one of the positive and negative wiring members of the second wiring member are stacked on one side of the capacitor element unit, and another of the positive and negative wiring members of the first wiring member and another of the positive and negative wiring members of the second wiring member are stacked on another side of the capacitor element unit,
wherein the switching circuit includes switching element units each of which includes the semiconductor switches, and
wherein a connection piece protruded from the positive wiring member of the first wiring member and a connection piece protruded from the positive wiring member of the second wiring member are stacked and connected for each of the switching element units, and a connection piece protruded from the negative wiring member of the first wiring member and a connection piece protruded from the negative wiring member of the second wiring member are stacked and connected for each of the switching element units.

* * * * *